United States Patent
McRobert

(10) Patent No.: US 7,363,878 B2
(45) Date of Patent: Apr. 29, 2008

(54) WASTE EXTRACTION SYSTEM

(76) Inventor: Ian McRobert, 148 Eleventh Road, Wungong WA 6112 (AU)

(*) Notice: Subject to any disclaimer, the term of this patent is extended or adjusted under 35 U.S.C. 154(b) by 303 days.

(21) Appl. No.: 10/507,420

(22) PCT Filed: Mar. 13, 2003

(86) PCT No.: PCT/AU03/00307
§ 371 (c)(1), (2), (4) Date: Apr. 1, 2005

(87) PCT Pub. No.: WO03/075646
PCT Pub. Date: Sep. 18, 2003

(65) Prior Publication Data
US 2005/0183673 A1 Aug. 25, 2005

(30) Foreign Application Priority Data
Mar. 13, 2002 (AU) .................... PS1063

(51) Int. Cl.
A01K 63/04 (2006.01)
B01D 47/02 (2006.01)
B01D 1/14 (2006.01)

(52) U.S. Cl. .......... 119/259; 261/77; 261/123; 210/221.2; 210/167.26; 119/263; 119/245

(58) Field of Classification Search ........ 119/259, 119/269, 264, 245, 261, 263; 210/221.2, 210/167.26, 169, 601, 198.1; 261/77, 123
See application file for complete search history.

(56) References Cited
U.S. PATENT DOCUMENTS
1,574,783 A * 3/1926 Evert .................... 119/263
2,849,294 A * 8/1958 Ruth .................... 422/106
(Continued)

FOREIGN PATENT DOCUMENTS
EP 0224648 * 8/1986
(Continued)

*Primary Examiner*—Andrea M. Valenti
(74) *Attorney, Agent, or Firm*—Burr & Brown

(57) ABSTRACT

A waste extraction system (10) for an aquaculture tank (12) includes a first conduit (18) having a first end (20) and a distant second end, with a second conduit (22) disposed within the conduit (18). The second conduit (22) has a first end (24) which is co-terminus with the end (20) of the first conduit (18). A plate (26) extends transversely across the ends (20, 24) and laterally of the first conduit (18). An axial hole (28) is formed in the plate (26) to provide fluid communication with the second conduit (22), but the plate (26) otherwise closes off or seals the end (20) of the first conduit (18). Legs (30) are formed on an underside of the plate (26) to space the plate (26) from a bottom wall (16) of the tank (12). Apertures (34) are formed in the conduit (18) near its first end (20) to allow water to flow into a flow chamber (36) created between an inner surface of the conduit (18) and an outer surface of the conduit (22). The conduits (18, 20) exit the tank (12) at a location (38) which is at least partially below the water level (40) of the tank (12). A circular flow of water is generated in the tank (12) by having a water inlet manifold directing that allows incoming water to flow tangentially to an inside surface of a side wall (14) of the tank (12). By continually pumping water into the tank (12) while maintaining the water level (40), water is drawn from above the plate (26) through the apertures (34) in the first conduit (18) into the flow chamber (36) thereby creating a general upflow of water. Solid particulate material collects by action of centripetal force into a region beneath the plate (26) where it is entrained in water and flows up through the axial hole (28) in the plate (26) into the second conduit (22) and out of the tank (12).

16 Claims, 2 Drawing Sheets

U.S. PATENT DOCUMENTS

| | | | | |
|---|---|---|---|---|
| 2,871,820 | A | * | 2/1959 | Hayden ................... 119/261 |
| RE28,116 | E | * | 8/1974 | Cohen ................... 210/167.22 |
| 3,841,999 | A | * | 10/1974 | Bennett et al. ............ 210/617 |
| 3,924,570 | A | * | 12/1975 | Lamonica ................ 119/261 |
| 4,780,217 | A | * | 10/1988 | Petersen ................. 210/758 |
| 5,139,659 | A | * | 8/1992 | Scott ................... 210/167.26 |
| 5,160,431 | A | * | 11/1992 | Marioni ................ 210/167.23 |
| 5,484,525 | A | * | 1/1996 | Mowka, Jr. ............ 210/167.26 |
| 6,032,931 | A | * | 3/2000 | Plunkett ................... 261/77 |
| 6,280,625 | B1 | * | 8/2001 | Jackson et al. ............ 210/617 |
| 6,715,743 | B2 | * | 4/2004 | Zhang .................... 261/130 |
| 6,808,625 | B1 | * | 10/2004 | Wu ..................... 210/221.2 |
| 2003/0178352 | A1 | * | 9/2003 | How et al. ................ 210/169 |
| 2006/0180531 | A1 | * | 8/2006 | Bonifer ................... 210/169 |

FOREIGN PATENT DOCUMENTS

| | | |
|---|---|---|
| JP | 06-090638 | 4/1994 |
| JP | 10337131 | 12/1998 |
| SE | 8106549 | 6/1983 |
| WO | 93/23994 | 12/1993 |

* cited by examiner

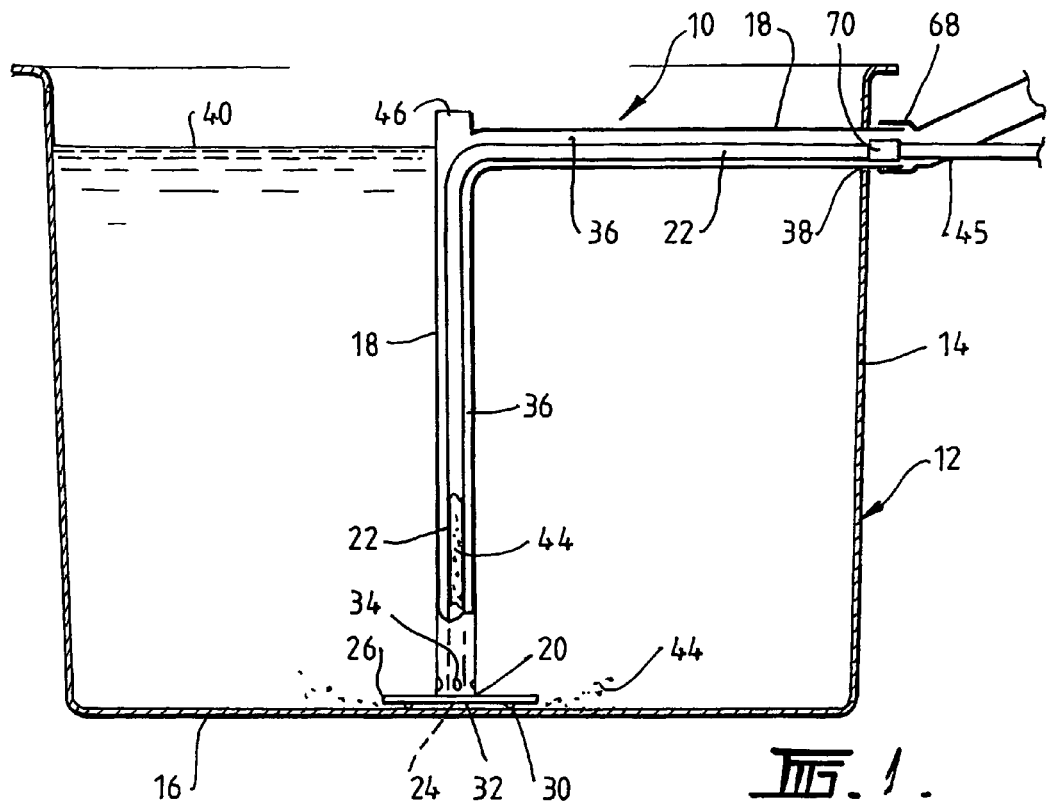
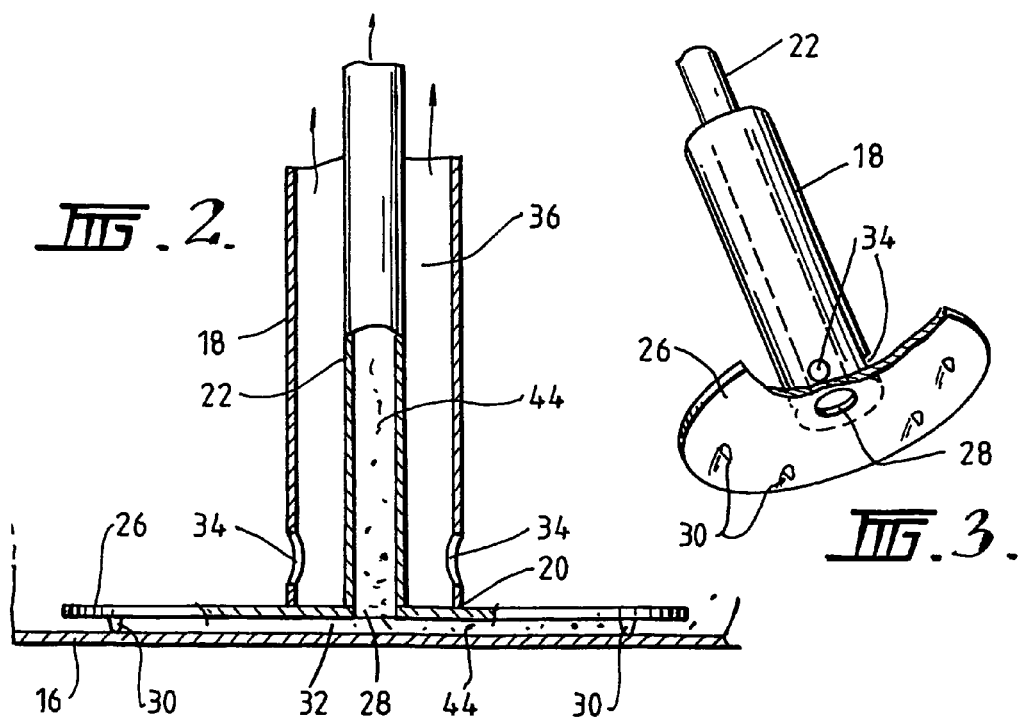

WASTE EXTRACTION SYSTEM

FIELD OF THE INVENTION

The present invention relates to a waste extraction system for liquid receptacles, and particularly though not exclusively for, aquaculture tanks and ponds.

BACKGROUND OF THE INVENTION

When breeding marine animals in tanks or ponds it is necessary to ensure good water quality to promote growth and good health of the marine animals. To this end, the water within an aquaculture tank or pond is typically circulated through a filter to extract solid particles and other waste material. In its simplest form, this is achieved by plumbing an outlet pipe to the tank or pond which is coupled to a pump and filter so that water from the tank or pond can be drawn through the outlet pipe and through the filter, with the filtered water returned to that particular tank or pond or to another tank or pond.

Lunde et al in U.S. Pat. No. 5,636,595 teaches a device for removing sediment particles from water in aquaculture tanks which includes a chamber within a tank that acts as a particle trap and having one conduit for drawing off water and another for drawing off the particles, both conduits feeding from the chamber.

While the Lunde system can be retrofitted to existing tanks, it appears that the preferred option is to form the chambers of the device integrally with the tank. This requires plumbing to the undersurface of a bottom wall of the tank. A further potential downside is that the chamber may eventually fill with particles and require separate cleaning.

OBJECT OF THE INVENTION

It is an object of the present invention to provide an alternate system for extracting waste from aquaculture receptacles, and in particular, a system which does not require plumbing to an undersurface of a bottom wall of an aquaculture receptacle.

SUMMARY OF THE INVENTION

According to the present invention there is provided a waste extraction system for an aquaculture receptacle having a side wall and a bottom wall, said receptacle filled with water to a particular water level, said system including at least:

a first conduit having first and second ends;

a second conduit disposed inside said first conduit, said second conduit having first and second ends;

a plate extending transversely across and sealing said first end of said first conduit and extending laterally of said first conduit, said plate provided with an axial hole in fluid communication with said first end of said second conduit, and said first end of said first conduit provided with at least one aperture near said plate; and, spacer means on a surface of said plate opposite said first conduit for spacing said plate from said bottom wall;

said first and second conduits configured to exit said tank at a location at least partially below said pre-determined water level.

Preferably said system includes: a sleeve extending about a length of said first conduit to define a region between an inside surface of said sleeve and an outside surface of said length of said first conduit, said sleeve having a first end above said at least one aperture and a second end above said first end of said sleeve; and, means for delivering a gas through said region.

Preferably said means for delivering a gas includes a distributor at said first end of said sleeve for distributing said gas to flow from near said first end of said sleeve about said first conduit.

Preferably said first conduit includes an opening between its first and second ends, said opening disposed above said water level.

Preferably each of said first and second conduits have a first length which includes the respective first ends of said conduits, and extends generally vertically; and, a second length that extends generally horizontally, said second length disposed at least partially below said water level.

According to the present invention there is provided an aquaculture system including:

a receptacle for holding a volume of water said receptacle having a side all and a bottom wall;

a water inlet through which water is delivered to said receptacle, said inlet configured to induce a circular flow of water within said receptacle;

a first conduit having first and second ends;

a second conduit disposed inside said first conduit, said second conduit having first and second ends;

a plate extending transversely across and sealing said first end of said first conduit and extending laterally of said first conduit, said plate provided with an axial hole in fluid communication with said first end of said second conduit, and said first end of said first conduit provided with at least one aperture near said plate; and, spacer means on a surface of said plate opposite said first conduit for spacing said plate from said bottom wall;

said first and second conduits configured to exit said tank at a location at least partially below said pre-determined water level.

BRIEF DESCRIPTION OF THE DRAWINGS

An embodiment of the present invention will now be described by way of example only with reference to the accompanying drawings in which:

FIG. 1 is a schematic representation of an embodiment of the waste extraction system;

FIG. 2 is an enlarged view of a bottom portion of the system shown in FIG. 1;

FIG. 3 is a partial perspective view of the bottom portion depicted in FIG. 2;

DETAILED DESCRIPTION OF PREFERRED EMBODIMENTS

Figures 4, 5:
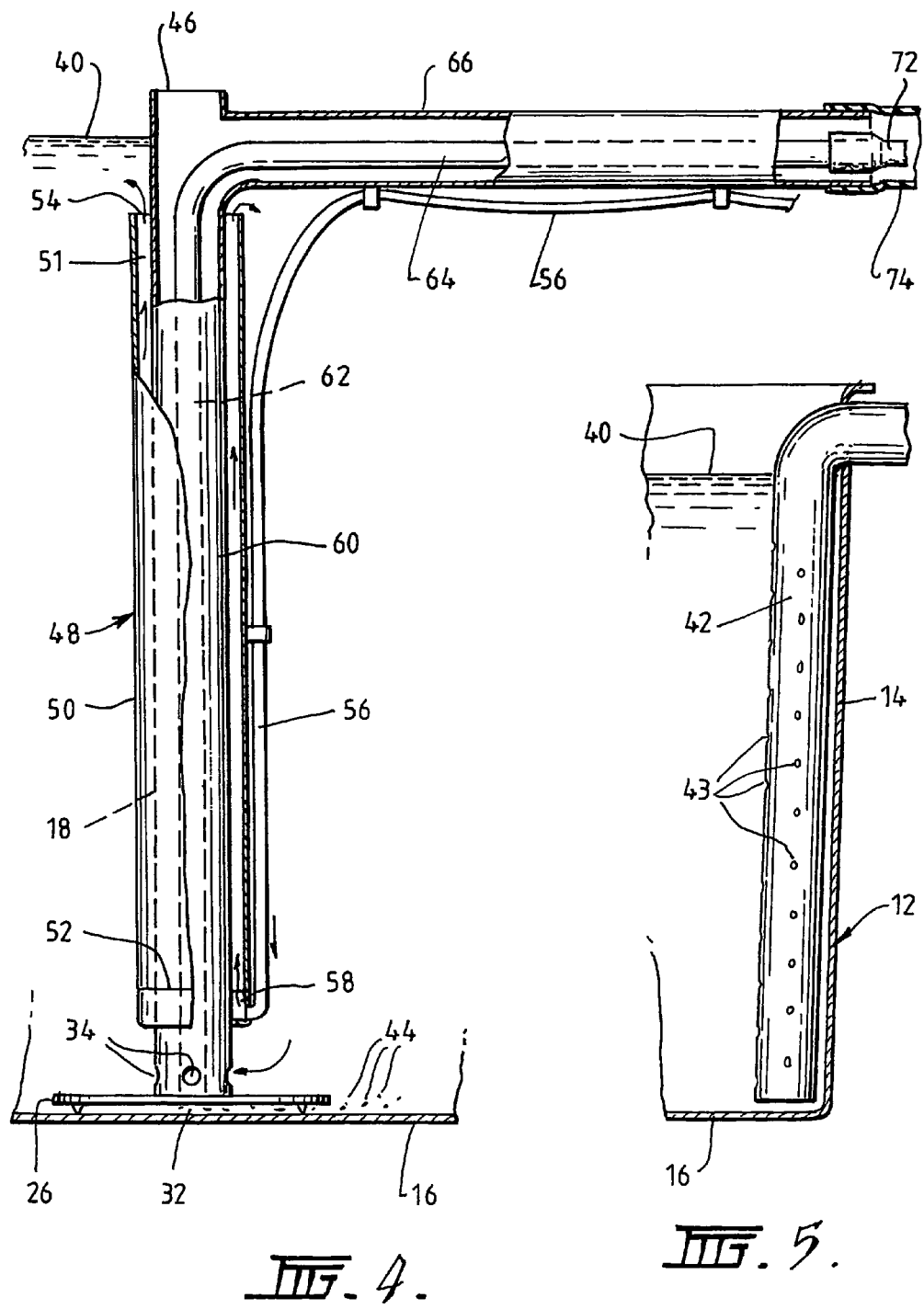
FIG. 4 is a side view of a second embodiment of the system.
FIG. 5 is a representation of an aquaculture tank in which the system can be used.

FIG. 1 illustrates an embodiment of the waste extraction system 10 for an aquaculture receptacle such as a tank 12. The tank 12 has a circumferential side wall 14 and a bottom wall 16. The system 10 includes a first conduit 18 having the first end 20 and a distant second end (not shown). Inside the conduit 18 is a second conduit 22. The second conduit 22 has a first end 24 which is substantially co-terminus with the end 20. A plate 26 extends transversely across the first end 20 and also laterally of the first conduit 18. An axial hole 28

(see FIG. 3) is formed in the plate 26 to provide a fluid communication with the second conduit 22. Thus, the plate 26 in effect closes off or seals the end 20 of the conduit 18. Spacer means in the form of short legs 30 are formed on an undersurface of the plate 26 to space the plate 26 from the bottom wall 16 of the tank 12. As explained in greater detail below, this creates a collection region 32 for solid particles. At last one aperture 34 (in this instance, 3 shown) is formed in the conduit 18 near the end 20 to allow water to flow into a flow chamber 36 formed between an inner surface of the conduit 18 and outer surface of the conduit 22. The conduits 18 and 22 exit the tank 12 at a location 38 which is at least partially below the water level 40 (see in particular FIG. 4) of the tank 12.

Typically, the system 10 is disposed within a tank 12 in which is created a circular flow of water as depicted in FIG. 5. This flow of water can be generated by having a water inlet manifold or pipe 42 with one or more outlets 43 for directing incoming water to flow tangentially to the inside surface of the wall 14 thereby creating a circular flow or vortex of water within the tank 12. As a result of the circulating flow of water any particulate matter including faeces and food is drawn to the axis of rotation of the water flow. Typically, when the tank 12 is a circular tank, this axis will be the central axis of the tank itself. By placing the system 10 at a position so that the ends 20 and 24 are in general alignment with the axis, the particulate material tends to collect on the bottom wall 16 beneath the plate 26. By continually pumping water into the tank 12 while maintaining the water level 40, water is drawn from above the plate 26 through the apertures 34 and the flow chamber 36 out of the tank at exit point 38. This water in effect flows by action of gravity through the flow chamber 36 and can be passed through a filter. The solid particulate matter 44 is caused to move by action of the circulating water (which applies a centripetal force on the matter 44) into the collection region 32 beneath the plate 26 where it is entrained in water and flows up through the axial hole 28 into the conduit 22 and out of the tank 12. This matter may be diverted to a settling pond, sludge tank or other processing unit To this end, the second conduit 22 may pass through a sealed hole 45 formed in the conduit 18 outside of the tank 12.

As shown in particular in FIGS. 2 and 4, the conduit 18 is provided with an opening 46 between its first end 20 and second end above the water level 40. The opening 46 provides an overflow drain in the event of malfunction in a water level control system (not shown, but which may be a known system including a float valve) so that the water level within the tank 12 cannot substantially exceed the height of the opening 46. The opening 46 also opens the conduit 18 to air pressure to prevent the siphoning of water from the tank 12.

To further assist in drawing water through the conduit 18 and solid matter through the conduit 22, an airlift arrangement 48 may be provided. The airlift arrangement 48 includes a sleeve 50 extending about a length of the conduit 18. An annular region 51 is defined or formed between the inner surface of the sleeve 50 and outer surface of the conduit 18. The sleeve 50 has a lower end 52 disposed above the apertures 34 and an opposite end 54 above the first end 52. The airlift 48 also includes a hose 56 for supplying gas (typically air) to an annular distributor 58 provided at the end 52 of the sleeve 50. When air is pumped through the hose 56, the air exits through the distributor 58 and flows upwardly through the region 51 about the conduit 18 inducing a general uplift or flow of water, assisting in the drawing of water through conduits 18 and 22.

In the illustrated embodiment, the conduits 18 and 22 are provided with generally vertically extending lengths 60 and 62 respectively and respective second lengths 64 and 66 which extend generally horizontally. The horizontal lengths 64 and 66 are disposed at least partially below the water level 40.

The present system 10 can be easily retrofitted to existing aquaculture tanks 12 and can be easily lifted out of the tank either manually or by use of simple hoists to allow the performance of various tasks such as cleaning of tank 14 or grading of marine animals. Thus the waste extraction system 10 facilitates the provision of an aquaculture system having a removable waste extraction system. To enable removal of the conduits 18 and 22, the conduits may be formed of a flexible material or include a section of flexible material; or be provided with articulation means such as swivel or rotary joints to allow them to be lifted or rotated out of the tank 12. For example rotary joints 68 and 70 (refer FIG. 1) can be provided in lengths 64 and 66 of conduits 18 and 22 to rotate the lengths 60 and 62 180° about an axis parallel to length 64. The joints 68 and 70 can be disposed either inside or outside the tank 12. Alternately, conduits 18 and 22 can be provided with respective lengths 72 and 74 (refer FIG. 4) of flexible hose to enable the length of the conduits 18 and 22 from the lengths 22 and 74 to the plate 26 to be lifted or rotated from the tank 12. Indeed the entirety of the conduits 18 and 22 may be made of flexible material to achieve this effect To further assist in removing the waste water extraction system from a tank, rather than the conduit 18 passing through a hole in the side wall 14 of the tank 12 at location 38, the tank 12 can be provided with an open channel 76 (shown in phantom) through which the conduit 18 (and thus conduit 22) extend. In yet a further variation, couplings can be provided at say the location of and instead of lengths 72 and 74 to enable decoupling of the conduits 18 and 22.

There is no need to physically plumb pipes beneath the bottom wall 16. Further, there is no recess or chamber in which particulate material can build up. Further, the flow of water and solids through the conduits 18 and 22 is achieved by the combined effects of gravity and pumping fresh water into the tan There is no need to plumb the conduits 18 and 22 to a pump in order to draw water from the tank 12.

Now that an embodiment of the present invention has been described it will be obvious to persons of ordinary skill in the art that numerous modifications and variations may be made without departing from the basic inventive concepts. For example, while the plate 26 is depicted as being circular, it may be in the form of other shapes. Further, it is not a requirement for the conduit 22 to be held co-axially within the conduit 18.

All such modifications and variations are deemed to be within the scope of the present invention the nature of which is to be determined form the above description and the appended claims.

The claims defining the invention are as follows:

1. A waste water extraction system for an aquaculture receptacle having a side wall and a bottom wall, said receptacle filled with water to a particular water level, said system including at least:

a first conduit having first and second ends;

a second conduit disposed inside said first conduit, said second conduit having first and second ends;

a plate extending transversely across and sealing said first end of said first conduit and extending laterally of said first conduit, said plate provided with an axial hole in fluid communication with said first end of said second conduit, and said first end of said first conduit provided with at least one aperture near said plate; and, spacer means on a surface of said plate opposite said first conduit for spacing said plate from said bottom wall;

said first and second conduits configured to exit said receptacle at a location at least partially below said pre-determined water level.

2. The waste water extraction system according to claim 1 including a sleeve extending about a length of said first conduit to define a region between an inside surface of said sleeve and an outside surface of said length of said first conduit, said sleeve having a first end above said at least one aperture and a second end above said first end of said sleeve; and, means for delivering a gas through said region.

3. The waste water extraction system according to claim 2 wherein said means for delivering a gas includes a distributor at said first end of said sleeve for distributing said gas to flow from near said first end of said sleeve about said first conduit.

4. The waste water extraction system according to claim 3 wherein said first conduit includes an opening between its first and second ends, said opening disposed above said pre-determined water level.

5. The waste water extraction system according to claim 4 wherein each of said first and second conduits include a first length that contains the respective first ends of said conduits, and extends generally vertically; and, a second length that extends generally horizontally, said second length disposed at least partially below said pre-determined water level.

6. A system according to claim 1 wherein said first and second conduits are arranged to enable lifting of said plate from said bottom wall of said receptacle.

7. An aquaculture system including:

a receptacle for holding a volume of water, said receptacle having a side wall and a bottom wall;

a water inlet through which water is delivered to said receptacle, said inlet configured to induce a circular flow of water within said receptacle;

a first conduit having first and second ends;

a second conduit disposed inside said first conduit, said second conduit having first and second ends;

a plate extending transversely across and sealing said first end of said first conduit and extending laterally of said first conduit, said plate provided with an axial hole in fluid communication with said first end of said second conduit, and said first end of said first conduit provided with at least one aperture near said plate; and, spacer means on a surface of said plate opposite said first conduit for spacing said plate from said bottom wall;

said first and second conduits configured to exit said receptacle at a location at least partially below said pre-determined water level.

8. A waste water extraction system for an aquaculture receptacle having a side wall and a bottom wall, said receptacle filled with water to a particular water level, said system comprising:

a first conduit having first and second ends;

a second conduit disposed inside said first conduit, said second conduit having first and second ends, a flow chamber being defined between said first and second conduits through which water flows;

a plate extending transversely across and sealing said first end of said first conduit and extending laterally of said first conduit, said plate provided with an axial hole in fluid communication with said first end of said second conduit, and said first end of said first conduit provided with at least one aperture near said plate;

at least one spacer disposed on a surface of said plate opposite said first conduit for spacing said plate from said bottom wall;

said first and second conduits being configured to exit said receptacle at a location at least partially below said pre-determined water level.

9. A waste water extraction system according to claim 8 comprising a sleeve extending about a length of said first conduit to define a region between an inside surface of said sleeve and an outside surface of said length of said first conduit, said sleeve having a first end above said at least one aperture and a second end above said first end of said sleeve; and, means for delivering a gas through said region.

10. The waste water extraction system according to claim 9 wherein said means for delivering a gas includes a distributor at said first end of said sleeve for distributing said gas to flow from near said first end of said sleeve about said first conduit.

11. The waste water extraction system according to claim 10 wherein said first conduit includes an opening between its first and second ends, said opening disposed above said pre-determined water level.

12. The waste water extraction system according to claim 11 wherein each of said first and second conduits include a first length that contains the respective first ends of said conduits, and extends generally vertically; and, a second length that extends generally horizontally, said second length disposed at least partially below said pre-determined water level.

13. A system according to claim 8 wherein said first and second conduits are arranged to enable lifting of said plate from said bottom wall of said receptacle.

14. An aquaculture system comprising:

a receptacle for holding a volume of water, said receptacle having a side wall and a bottom wall;

a water inlet through which water is delivered to said receptacle, said inlet configured to induce a circular flow of water within said receptacle;

a first conduit having first and second ends;

a second conduit disposed inside said first conduit, said second conduit having first and second ends, a flow chamber being defined between said first and second conduits through which water flows;

a plate extending transversely across and sealing said first end of said first conduit and extending laterally of said first conduit, said plate provided with an axial hole in fluid communication with said first end of said second conduit, and said first end of said first conduit provided with at least one aperture near said plate; and, at least one spacer disposed on a surface of said plate opposite said first conduit for spacing said plate from said bottom wall;

said first and second conduits being configured to exit said receptacle at a location at least partially below said pre-determined water level.

15. A method of extracting waste water from an aquaculture receptacle having a side wall and a bottom wall, said receptacle filled with water to a particular water level, said method comprising:

providing a first conduit having first and second ends;

providing a second conduit inside said first conduit to form a flow chamber therebetween, said second conduit having first and second ends;

providing a plate extending transversely across and sealing said first end of said first conduit and extending laterally of said first conduit;

forming an axial hole in said plate and in fluid communication with said first end of said second conduit;

forming at least one aperture in said first end of said first conduit near said plate;

spacing a surface of said plate opposite said first conduit from said bottom wall;

disposing first and second conduits to exit said receptacle at a location at least partially below said pre-determined water level; and, pumping water to said receptacle, wherein water is continually pumped into said receptacle while maintaining said pre-determined water level wherein water is drawn from above the plate through the apertures in said first conduit into said flow chamber thereby creating a general upflow of water.

16. The method of claim 15 further comprising generating a circular flow of water in the receptacle about said first conduit.

* * * * *